Aug. 29, 1967   C. C. McCLENNY ET AL   3,338,420
GARMENT CONVEYOR AND DISPENSER
Filed March 8, 1966   2 Sheets-Sheet 1
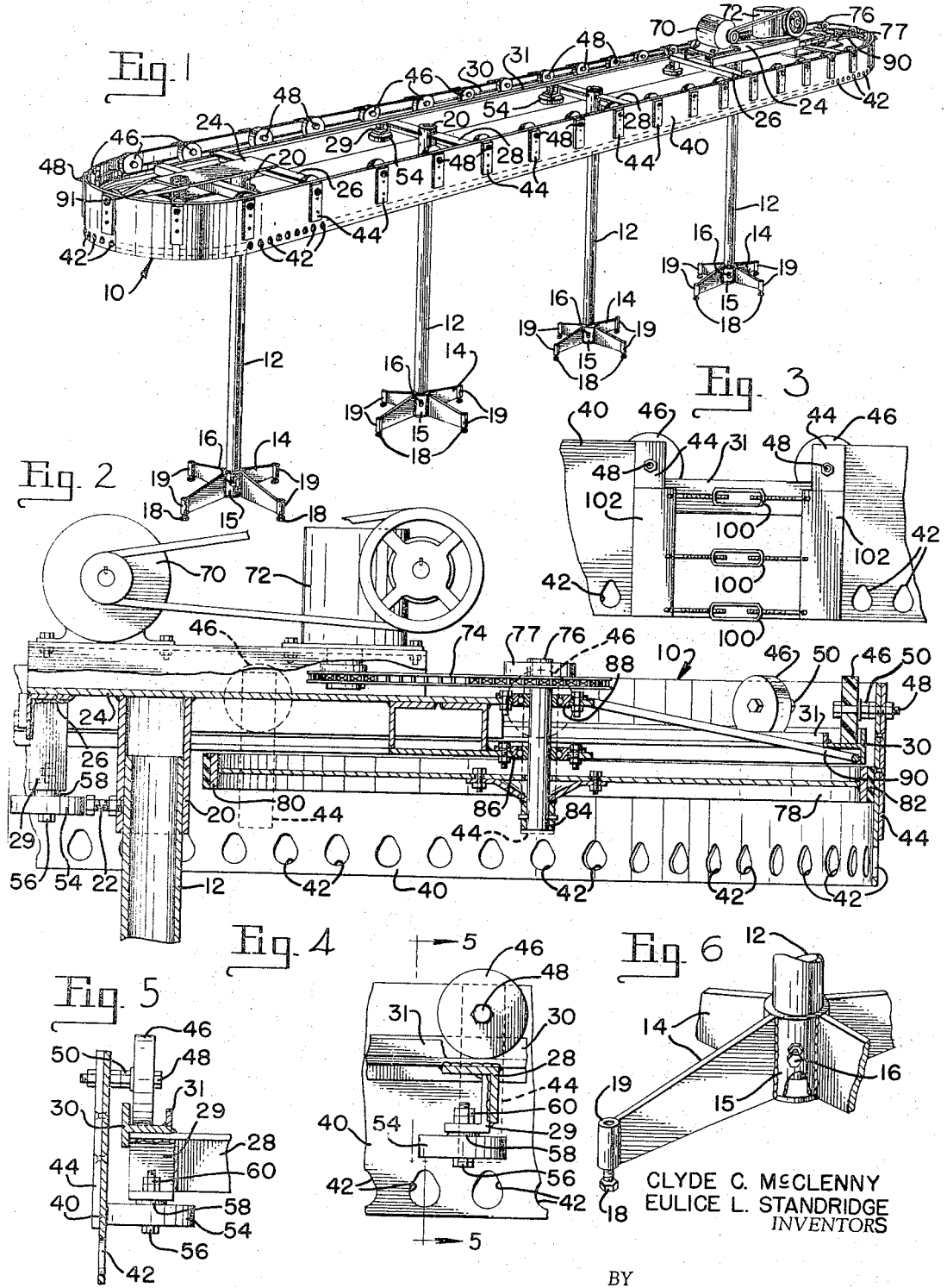
CLYDE C. McCLENNY
EULICE L. STANDRIDGE
INVENTORS
BY
Wayland D. Keith
THEIR AGENT Aug. 29, 1967  C. C. McCLENNY ET AL  3,338,420
GARMENT CONVEYOR AND DISPENSER
Filed March 8, 1966  2 Sheets-Sheet 2
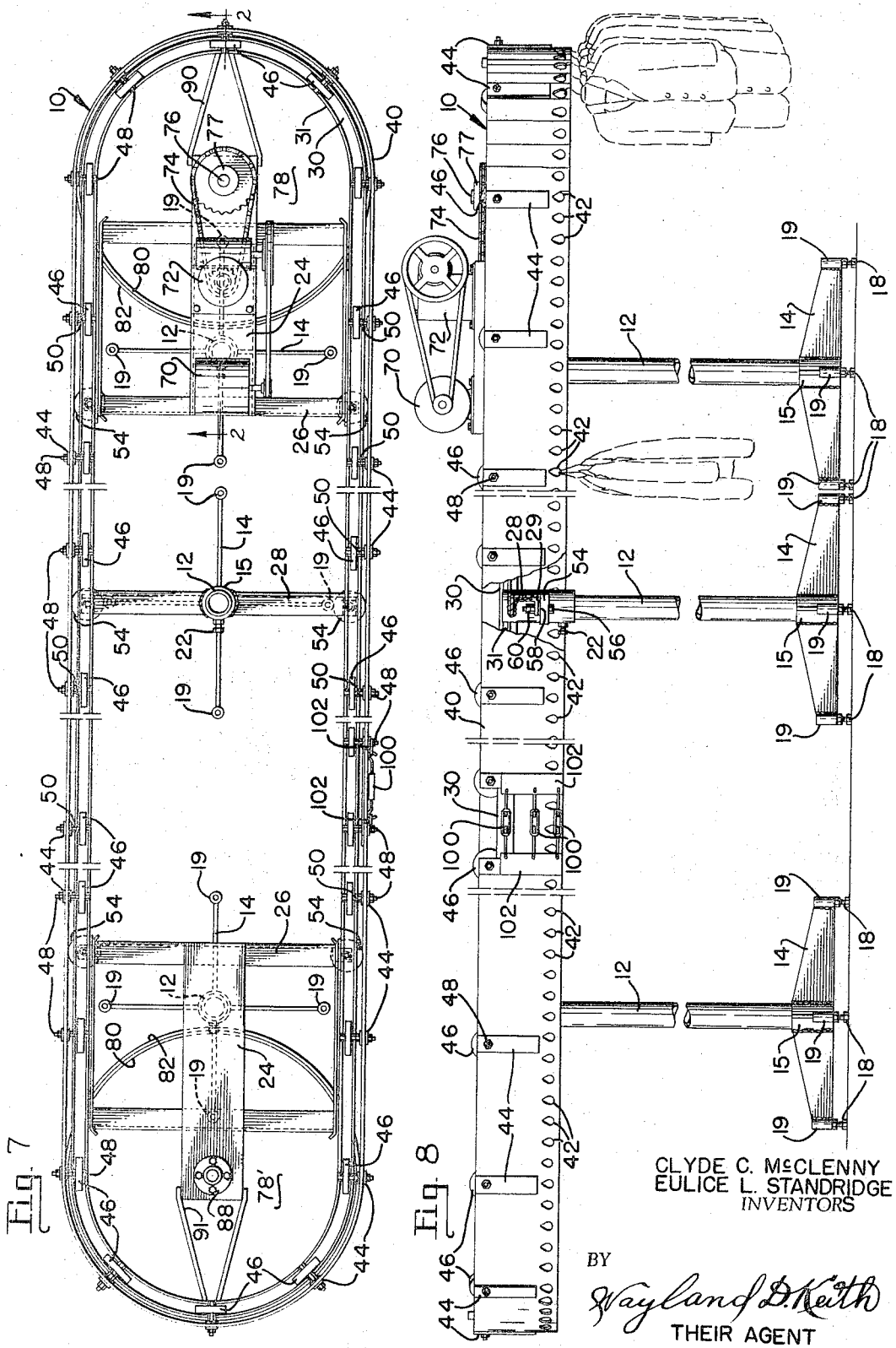
CLYDE C. McCLENNY
EULICE L. STANDRIDGE
INVENTORS
BY
Wayland D. Keith
THEIR AGENT

United States Patent Office 3,338,420
Patented Aug. 29, 1967

3,338,420
GARMENT CONVEYOR AND DISPENSER
Clyde C. McClenny and Eulice L. Standridge, both of P.O. Box 307, Temple, Okla. 73568
Filed Mar. 8, 1966, Ser. No. 532,814
9 Claims. (Cl. 211—1.5)

This invention relates to conveyors for delivering various articles to preselected locations. The form of the device herein described and illustrated is particularly useful in dry cleaning establishments and the like and consists of a mechanism for holding a rather large number of garments which have been dry cleaned, pressed, and placed onto a coathanger or the like, while awaiting dispensing to the customer. The device is capable of storing a maximum number of garments in a minimum amount of space, and yet has the capability of making the garment quickly available when the customer calls for it.

The present invention comprehends an endless conveyor traveling along an oval track and in a horizontal plane, which may be advanced or reversed in direction of travel so as to bring any preselected garment to a predetermined location within a minimum length of time. It is desirable that the conveyor mechanism be operable at a remote position therefrom, so as to enable the conveyor to be loaded and unloaded with the garments at any desired location with respect thereto.

An object of the present invention is to provide a continuous conveyor means having an article supporting means thereon that provides for selectively removing different articles from the conveyor at preselected positions along the path of travel of the conveyor.

Another object of this invention is the provision of a horizontally traveling conveyor wherein various articles are suspended therefrom and accordingly carried about in a circuitous path of travel.

Another object of this invention is to provide an article storing and delivering conveyor which is driven by a power means having a novel power transmitting means associated with the conveyor means.

Another object of this invention is the provision of a garment dispenser which includes a continuous traveling conveyor supported by a rail assembly that is hidden from view by the conveyor belt; the conveyor being supported outwardly from and above the track.

A still further object of this invention is the provision of a garment dispenser that includes a conveyor fabricated from a flexible sheet of stainless steel that cooperates with an elastomer face of a power drive means to effect movement of the conveyor.

Still another object of this invention is the provision of a conveyor system having a particular structural arrangement that eliminates structural distortion when the loaded conveyor is accelerated or decelerated.

In the drawings:

FIGURE 1 is a perspective view of the conveyor system constructed in accordance with the principles of the invention and including the supporting structure therefor;

FIGURE 2 is an enlarged power transfer section taken longitudinally along line 2—2 of FIGURE 7 and at the powered end of the conveyor;

FIGURE 3 is a side view of a portion of the conveyor system;

FIGURE 4 is a detail of part of the conveyor system as seen from the inside thereof;

FIGURE 5 is a fragmentary section taken along lines 5—5 of FIGURE 4;

FIGURE 6 is a perspective view of the support means of FIGURE 1 with some parts broken away;

FIGURE 7 is a top plan view of the conveyor system of FIGURE 1;

FIGURE 8 is a side view of the traveling conveyor system of FIGURE 1 with some parts broken away to show the details hidden therein.

Referring now to the drawings in detail, and in particular to FIGURE 1 in conjunction with the remaining figures, wherein there is disclosed a conveyor system indicated generally by the numeral 10, and showing the garment dispenser mounted in operative position and supported by adjustable legs 12 that extend from a stand or spider 14. The conveyor 40 follows an oval-like path as generally illustrated in FIGURE 7, although the garment dispenser may also be placed in an L-shaped configuration if desired. Operatively mounted above the conveyor 40 is a motor 70 that drives a gear box or power reducer 72, that in turn is suitably adapted to cause conveyor 40 to travel about the oval track, as will be disclosed in greater detail later on.

The stand or spider 14 is provided with four legs which depend from a lower cylindrical central support means 15 having a lock bolt and nut arrangement 16 threaded therein to provide a lower adjustment by which the height of the garment dispenser may be regulated. At the outer extremity of each leg of the spider 14 there is provided a threaded load transferring means 19 adapted to threadedly engage leveling adjustment 18. The adjustable leg 12 is slidably received in the upper cylindrical support 20 that is also provided with a lock bolt and nut arrangement 22 so as to provide a second means by which the height of the garment dispenser may be adjusted. Cylindrical support 20 is rigidly attached by welding or the like to platform 24 which transfers the load of the garment dispenser from rail 31 by means of the transverse load transmitting members 26 which are suitably welded to the track means 30. Rigidly attached between the platform 24 and the curved portion of the track 30 are cabane V struts 90, 91 which transfers the web tension of the conveyor to the platform 24 and prevents the bending moment produced by acceleration or deceleration of a large load from causing distortion or slight movement of the remaining structure of the garment dispenser. The platform and cabane V struts are required at each wheel 78, 78' to provide a force in opposition to the tension of the belt 40 that places the garment dispenser in compression. Between the before described support means located at each extremity of the garment dispenser are a multiplicity of adjustable legs 12 associated with a transverse load transmitting member 28 that transfers a portion of the load of the garment dispenser from the rail system to the floor or ground level as seen in detail in FIGURES 1 and 8.

The oval rail system 30 forms a continuous track and is comprised of a T-bar having an upstanding member 31 welded thereto so as to form a U-shaped track with an extended side or flange as seen in FIGURE 5. The rail 30 is welded to the transverse load transmitting members 28 as indicated in FIGURES 4 and 5. The upper roller 46 rides inside the U-shaped portion of the channel member of the rail 30 and supports the weight of the traveling conveyor 40 through a load transferring and reinforcing plate 44 which is apertured at the upper extremity thereof to receive bolt 48 which in turn is rotatably attached to the upper roller 46 and provided with a spacer 50 and a lock nut 52. The spaced 50 is preferably a pair of threaded jam nuts which are tightened to rigidly hold the bolt 48 attached to the conveyor web 40 and to the reinforcing plate 44 in a manner so as to permit low frictional rotation of the roller 46 relative thereto. Movement of the web 40 effects movement of the roller 46 within the U-shaped track 30. A roller pad 29 is welded to each extremity of the transverse members 26, 28 and is apertured so as to receive the bolt 56, spacer 58, and lock nut 60 operatively assembled as seen in FIGURES 4 and 5. The lower rollers 54 maintain the conveyor 40 a spaced distance from the remaining structure as illustrated in FIGURES 5 and 7.

Operatively mounted upon one of the platforms 24 is a motor 70 that drives power reducer 72 that in turn is geared to a shaft 76 by a sprocket hub 77 which receives the drive chain 74 from the output shaft of the power reducer 72. The power wheel shaft 76 is journaled by upper and lower thrust bearings 86, 88 and is rigidly and removably attached to the power wheel hub 84 that in turn maintains the power wheel 78 properly aligned with respect to the remaining structure. The power wheel 78 is provided with a rim 80 that carries a neoprene elastomer face 82 glued and riveted thereto. The conveyor belt 40 is preferably fabricated from 20 gage stainless steel and apertured as at 42 so as to receive hangers containing articles of clothing therein in a manner similar to that illustrated, in FIGURE 8. The apertures 42 are teardrop or oval in shape and located near the bottom edge of the conveyor belt 40. The inside face of the conveyor belt 40 rides against the elastomer face 82 of the power wheel 78 at one extremity of the garment dispenser and against a similar free-wheeling power wheel 78' located at the opposite extremity of the garment dispenser. The elastomer facing that is provided on each of the wheels 78, 78' maintains positive traction between the power wheel and the conveyor 40. The conveyor belt 40 is further provided with turn buckles 100 which maintain the tension of the belt at a suitable value that will in turn permit the inside periphery of the conveyor belt to engage the elastomer facing of the power wheel with sufficient force to provide the before mentioned positive traction. The three turnbuckles at 100 are spaced apart so as to be misaligned with the power drive wheel 78. The turnbuckles 100 are provided with curved end portions that form a hook that engages the reinforcing plate 102 attached to load transferring plate 44 of the conveyor belt 40. This arrangement of mating the two ends of the continuous conveyor belt 40 prevents wrinkles and the like occurring at the mating edge of the belt, and further provides rapid adjustment means for controlling the tension of the belt.

As will now be readily apparent to those skilled in the art, from the above description taken in conjunction with the drawings, the conveyor belt 40 is a continuous stainless steel belt having tension adjustment means thereon and provided with built-up reinforcing means 44 attached to vertically positioned rollers 46 which in turn ride in a continuous track 30. The rollers 46 carry the weight of the conveyor belt including the contents thereof, while the lower horizontally disposed rollers 54 maintain the conveyor belt 40 in properly spaced relationship to the remaining structure. Hence, the conveyor belt 40 is suspended from a point outwardly and above the track 30 and in such a relationship as to hide the track and most of the remaining structure to accordingly provide a garment dispenser that is highly functional and extremely attractive in appearance. The weight of the conveyor belt 40 and the garments placed thereon is transmitted by roller 46 onto the track 30. The track 30 transmits the load imposed thereon to the transverse load transmitting members 28 which are supported by the upstanding legs 12 that in turn are bottom supported by spider 14. At each extremity of the longitudinally disposed garment dispenser the weight of the curved portion of the track and the remaining mechanism is carried by dual transverse load transmitting members 26 that are rigidly attached to the platform 24 that in turn is bottom supported by a similar leg 12.

The motor 70 is preferably a reversible type motor and may be equipped with dynamic braking and the like when deemed desirable. Any control system, either manual or selective automatic, as for example, a control system such as shown in the patent to Muffly, 2,786,169, and marketed by the Minneapolis Honeywell Company, may be employed to control the action of the motor 70.

Various means of carrying out a systematic loading and dispensing operation associated with the present garment dispenser may be employed where deemed desirable, including the provision of numbered stations about the periphery of the conveyor belt; however, these expedients are well known in the art, and are best left to the individual desires of the proprietor of the establishment wherein the novel device may be located.

In operation, the garments that are awaiting delivery are placed in the slots 42 in any suitable predetermined systematic manner, and when the garments are called for the operator of the garment dispenser merely actuates the motor 70 so as to drive the conveyor 40 in the direction desired until the garment being sought appears adjacent to the operator thereof, whereupon the motor 70 is de-energized and the hanger containing the garment may then be conveniently lifted from the aperture 42. Upon energizing the motor 70, the belt driven power reducer or gear box 72 provides power to the wheel 78 with rotational energy provided through the shaft 76 and sprocket hub 77 which is connected to the power reducer by the chain drive 74 to thereby cause rotation of the power wheel 78 that in turn positively moves the conveyor belt 40 due to the high friction between the inside surface of the conveyor belt 40 and the elastomeric surface 82 of the power wheel 78.

When the conveyor belt is loaded to near capacity, a considerable weight will be carried by the device and accordingly, upon initial starting and initial deceleration of the conveyor belt, a large twisting motion may be imparted to the structure of the device, which motion is minimized by the cabane struts 90, 91 located adjacent the upper thrust bearing 88 and connected below the track member 30. The cabane strut maintains the entire structure as an integral unit that exhibits a minimum of flexing upon starting and stopping of the system.

The entire system may be fabricated into three sections comprised of each curved end portion and the central straight portion. The three sections are held together in assembled relationship by only four flat head bolts to facilitate shipping so that the mechanism may be safely and simply assembled at its destination in a minimum of time. Additional center units may be easily fitted into the device so as to provide any length desired at a later date.

The present novel combination of the conveyor along with the reinforced roller attachment and the frame structure provides a garment dispenser having a conveyor belt which simultaneously serves as a support for the garments, a direct drive means for the hidden power wheel, and maintains the track and lower rollers hidden from view. Dirt and debris that normally sift down over the clean clothes is for the most part avoided by the instant novel device, since the elastomeric facing on the power wheel 78 and the free wheeling wheel 78' avoid the usual metal to metal contact associated with such a device and hence eliminates the manufacture of small debris that may sift down upon the garments as dust.

The materials of construction of the various elements used in the fabrication of the instant novel device are preferably of materials that are of light weight and high strength and durability including aluminum, alloys, and plastics. Nylon, Teflon, and the like including high tensile strength steels, such as stainless steel, are particularly suitable. The present design permits a light weight construction having low power requirements that is sufficiently rigid for the service demanded of it, yet is easily transported to a new location.

It will, of course, be understood that various changes may be made in the form, details, arrangement and proportion of the parts, without departing from the scope and spirit of the invention as set forth in the appended claims.

What is claimed as new and desired secured by Letters Patent in the United States is:

1. A garment dispenser comprising an endless track, rollers guided in and supported by said track;

a power driven vertically aligned continuous conveyor web means having article storage means thereon, said web being positioned circumferentially about said track in a horizontal plane and supported from a point outwardly from and above said track by said rollers;

means supporting said track including longitudinally spaced apart support means having an upper engaging member transverse to said track and spaced apart from one another longitudinally along said track with each extremity of said engaging member supportingly engaging adjacent portions of said track;

a power driven wheel and a freely rotating wheel disposed at opposite extremities of the dispenser with respect to each other and longitudinally of the track with the inside surface of said conveyor web riding in intimate contact with the outer periphery of said driven and said freely rotating wheel, whereby;

rotation of said power drive wheel imparts movement to said conveyor web to thereby deliver an article thereon to any predetermined point about said garment dispenser.

2. The garment dispenser of claim 1 wherein said upper engaging member is provided with a rigidly attached depending roller pad, a vertically aligned aperture in said pad;

lower roller means horizontally positioned and rotatably received on a bolt vertically and rigidly attached in said aperture;

said lower roller means being positioned with respect to said pad and to said conveyor web whereby the outside periphery of said roller rides against the lower inside peripheral surface of said web to thereby maintain said web properly aligned with respect to the remaining structure of the dispenser.

3. The garment dispenser of claim 1, wherein said track is comprised of a T-shaped structural member having an upstanding web member rigidly affixed to the free end thereof to thereby form a U-shaped track having a depending side that extends below said U-shaped member and accordingly provides a continuous flange about the lower outer periphery of the track.

4. The garment dispenser of claim 1, wherein said conveyor includes a multiplicity of tear-drop shaped apertures located about the lower edge thereof to thereby provide for the before mentioned article storage means.

5. The garment dispenser of claim 1, and further including a platform located at each extremity thereof;

transverse members rigidly attached between said platform and adjacent to members of said track;

a pair of cabane V struts rigidly attaching one end of said platform to said track with the apex of said cabane V being located at said track;

bearing means located in said platform adjacent said cabane V strut;

second bearing means spaced below and affixed to said platform in aligned relationship to the first recited bearing means;

shaft means rotatably received in said bearing means to provide mount means for said power drive wheel and for said freely rotating wheel.

6. The garment dispenser of claim 5 wherein the outer periphery of said wheels are provided with an elastomeric face to thereby provide positive traction between said wheel and said conveyor.

7. The garment dispenser of claim 5 wherein said power wheel shaft means is provided with a motor driven power reducer;

means mounting said motor driven power means on said platform associated with said power driven wheel; and, control means associated with said motor for controlling the movement of said conveyor along said track.

8. The garment dispenser of claim 1, and further including a load transferring plate of limited width rigidly attached to the outer peripheral surface of said conveyor and extending downwardly from a top edge thereof to a point removed from the bottom edge thereof;

said plate having means defining an aperture therein near the upper extremity thereof;

bolt means rigidly attached at said aperture and having a free end extending above said track;

means rotatably attaching one of said rollers to said free end of said bolt means to thereby permit said conveyor means to be moved along and supported by said track means.

9. The garment dispenser of claim 8 wherein said conveyor web is fabricated from an elongated sheet of flexible metal having a top, bottom, and free ends;

each said free end being provided with one said load transferring plate;

a reinforcing plate integrally attached to each said load transferring plate at each free end of said web;

apertures in said reinforcing plates with the apertures of one free end aligned with the apertures of the remaining free end;

turnbuckles arranged in corresponding aligned apertures of each free end, whereby;

the tension of said web may be regulated by said turnbuckles to thereby maintain said conveyor web in properly aligned tension.

References Cited

UNITED STATES PATENTS 2,980,258   4/1961   Collette _____ 211—1.5

ANDRES H. NIELSEN, *Primary Examiner.*

EDWARD SROKA, *Examiner.*